(12) United States Patent
Zhi et al.

(10) Patent No.: US 11,949,117 B2
(45) Date of Patent: Apr. 2, 2024

(54) BATTERY AND METHOD OF MANUFACTURING THEREOF

(71) Applicant: City University of Hong Kong, Kowloon (HK)

(72) Inventors: Chunyi Zhi, Shatin (HK); Ao Chen, Kowloon (HK); Zijie Tang, Pak Shek Kok (HK)

(73) Assignee: City University of Hong Kong, Kowloon (HK)

( * ) Notice: Subject to any disclaimer, the term of this patent is extended or adjusted under 35 U.S.C. 154(b) by 30 days.

(21) Appl. No.: 16/844,316

(22) Filed: Apr. 9, 2020

(65) Prior Publication Data
US 2021/0320286 A1  Oct. 14, 2021

(51) Int. Cl.
*H01M 50/256* (2021.01)
*H01M 50/10* (2021.01)
*H01M 50/148* (2021.01)
*H01M 50/46* (2021.01)
*H01M 50/54* (2021.01)

(52) U.S. Cl.
CPC ......... *H01M 50/256* (2021.01); *H01M 50/10* (2021.01); *H01M 50/148* (2021.01); *H01M 50/46* (2021.01); *H01M 50/54* (2021.01)

(58) Field of Classification Search
CPC .... H01M 50/256; H01M 50/54; H01M 50/10; H01M 50/46; H01M 50/148
See application file for complete search history.

(56) References Cited

U.S. PATENT DOCUMENTS

| | | | | |
|---|---|---|---|---|
| 2012/0219835 A1* | 8/2012 | Kawabe | ........... | H01M 10/0431 429/94 |
| 2014/0370347 A1* | 12/2014 | Jung | ................ | H01M 50/121 429/94 |
| 2015/0155589 A1* | 6/2015 | Suh | ................ | H01M 10/0463 429/127 |
| 2015/0200417 A1* | 7/2015 | Song | ................ | H01M 10/0583 29/623.2 |
| 2016/0172642 A1* | 6/2016 | Hughes | ............... | H01M 50/213 429/90 |
| 2017/0222280 A1* | 8/2017 | Asano | ............... | H01M 10/4235 |
| 2020/0052291 A1* | 2/2020 | Song | .................... | H01M 4/625 |
| 2020/0067144 A1* | 2/2020 | Holland | ............. | H01M 50/107 |
| 2020/0106073 A1* | 4/2020 | Fujita | ................ | H01M 10/0413 |
| 2020/0127245 A1* | 4/2020 | Fan | ...................... | H01M 50/119 |

(Continued)

OTHER PUBLICATIONS

C. Shi et al., "Accordion-like Stretchable Li-ion Batteries with High Energy Density", Energy Storage Materials, 17, 136-142 (2019).

(Continued)

*Primary Examiner* — Brian R Ohara
*Assistant Examiner* — Emily Elizabeth Freeman
(74) *Attorney, Agent, or Firm* — Renner, Kenner, Greive, Bobak, Taylor & Weber

(57) ABSTRACT

A battery includes a plurality of energy storage units, a flexible linkage arranged to physically and electrically connect each adjacent pair of energy storage units, and an encapsulation arranged to encapsulate the energy storage units and the linkages. The energy storage units are movable with respect to each other via the flexible linkage within each adjacent pair of energy storage units in the encapsulation.

25 Claims, 22 Drawing Sheets

(56) References Cited

U.S. PATENT DOCUMENTS

2020/0365837 A1* 11/2020 Jiang ................. H01M 50/102

OTHER PUBLICATIONS

X. Liao et al., "High-Energy-Density Foldable Battery Enabled by Zigzag-like Design", Advanced Energy Materials, 1802998 (2018).
G. Qian et al., "Bioinspired, Spine-like Flexible Rechargeable Lithium-ion Batteries with High Energy Density", Advanced Materials, 30(12), 1704947 (2018).

* cited by examiner

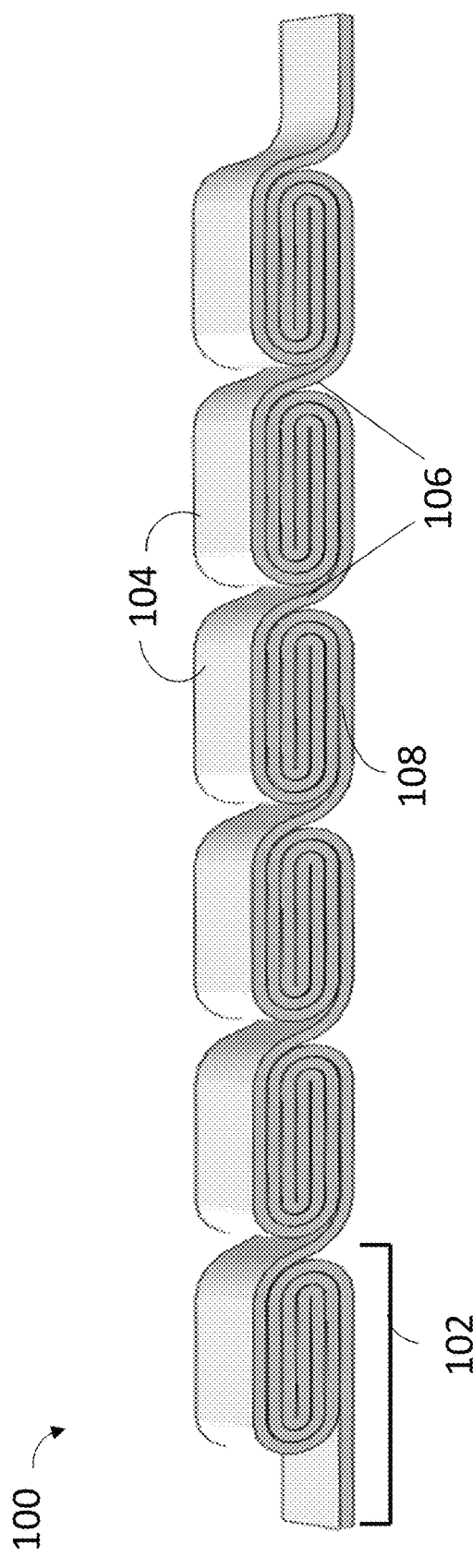
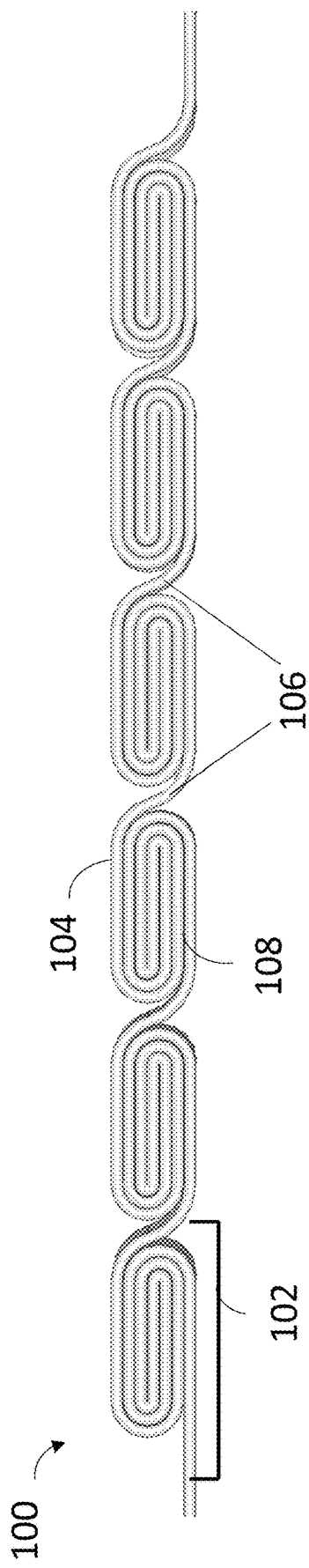
Figure 2A
Figure 2B

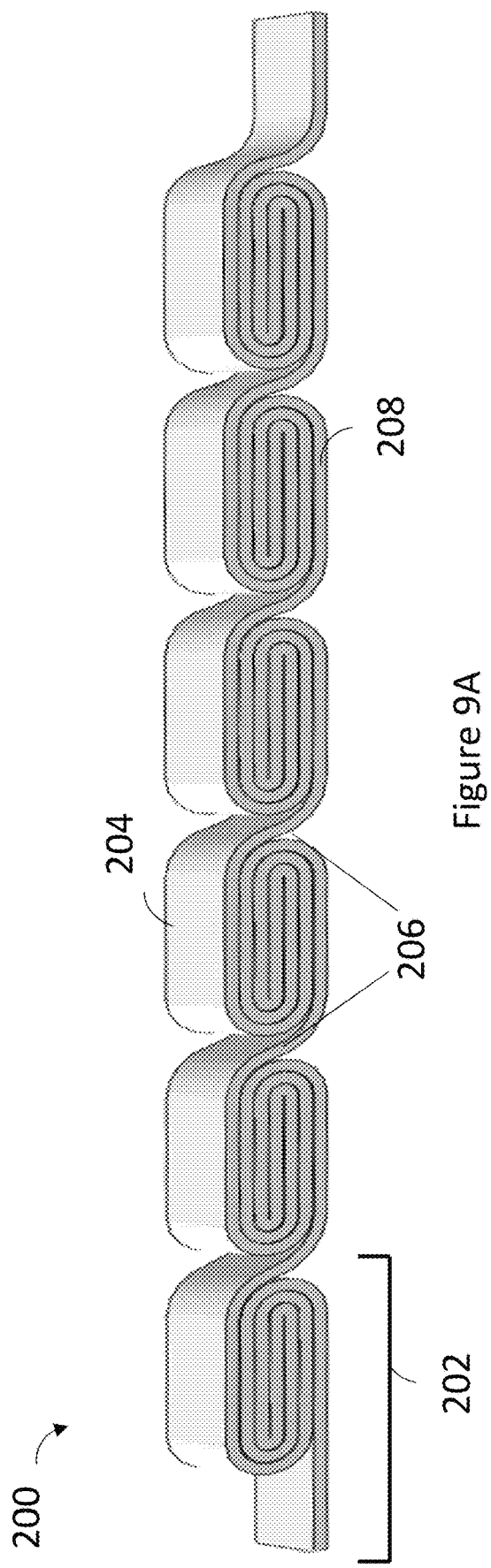
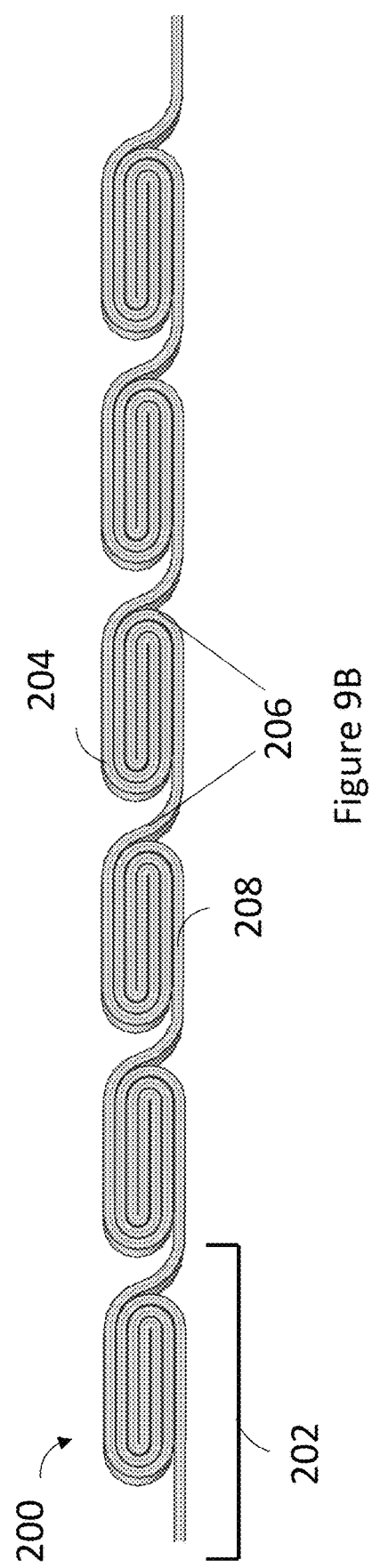
Figure 9A
Figure 9B

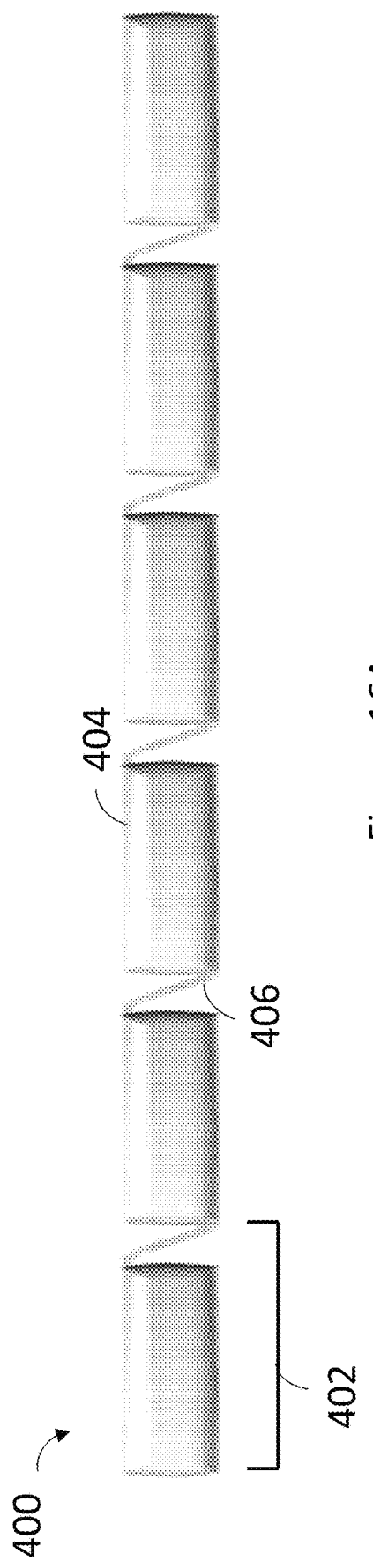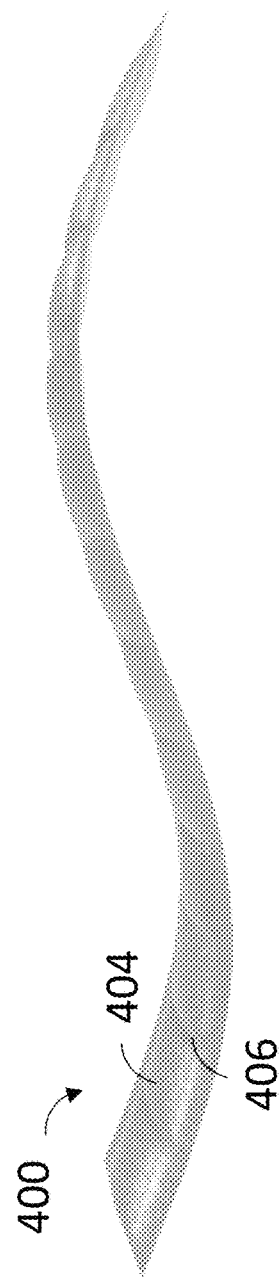
Figure 16A
Figure 16B

BATTERY AND METHOD OF MANUFACTURING THEREOF

TECHNICAL FIELD

The invention relates to a battery and particularly, although not exclusively, a flexible battery and a method of manufacturing thereof.

BACKGROUND

Flexible batteries, may be designed to be conformal and flexible with according to an engaging surface, with the ability to bend or twist when being used. They can be fabricated into different shapes and sizes, and maintain their characteristic shape even against subsequent or frequent bending or twisting.

Wearable electronics such as devices with flexible screens, foldable phones usually requires reliable electrical power delivered from batteries, especially those with high flexibility, durability and energy density, which make them suitable to be implemented in products.

SUMMARY OF THE INVENTION

In accordance with a first aspect of the invention, there is provided a battery comprising a plurality of energy storage units, a flexible linkage arranged to physically and electrically connect each adjacent pair of energy storage units, and an encapsulation arranged to encapsulate the energy storage units and the linkages. The energy storage units are movable with respect to each other via the flexible linkage within each adjacent pair of energy storage units in the encapsulation.

In one embodiment of the first aspect, the energy storage units and the linkages comprise a strain-relieving multilayer structure.

In one embodiment of the first aspect, the strain-relieving multilayer structure includes a first electrode and a second electrode, wherein the first electrode and the second electrode are of different thicknesses.

In one embodiment of the first aspect, the strain-relieving multilayer structure comprises a first electrode which is single coated and a second electrode which is double coated.

In one embodiment of the first aspect, the first electrode is an anode and the second electrode is a cathode.

In one embodiment of the first aspect, the energy storage units and the flexible linkages include the same multilayer structure of electrodes and a separator layer.

In one embodiment of the first aspect, the energy storage units comprise a folded structure, a wound structure, or a spiral structure of the multilayer structure.

In one embodiment of the first aspect, the battery further comprises a plurality of interconnecting battery segments each defining the energy storage units and the flexible linkage.

In one embodiment of the first aspect, each of the energy storage units comprises a shape of a cylinder, a cube, or a cuboid.

In one embodiment of the first aspect, each of the energy storage units comprises a shape of a triangular prism.

In one embodiment of the first aspect, the plurality of energy storage units is arranged to combine and form a hexagonal prism.

In one embodiment of the first aspect, the battery comprises six energy storage units in the shape of the triangular prism.

In one embodiment of the first aspect, the encapsulation is flexible.

In one embodiment of the first aspect, the combination of the energy storage units, the flexible linkages, and the encapsulation is stretchable.

In one embodiment of the first aspect, the battery further comprises a buffer member disposed between each adjacent pair of energy storage units.

In one embodiment of the first aspect, the buffer member includes a rubber spacer.

In accordance with a second aspect of the invention, there is provided a method of manufacturing a battery, comprising the steps of: providing a multilayer structure comprising an anode, a separator and a cathode, segmenting the multilayer structure into a plurality of interconnected segments, forming an energy storage unit and a flexible linkage in each of the plurality of interconnected segments, and encapsulating the multilayer structure in an encapsulation. The flexible linkage is arranged to physically and electrically connect each adjacent pair of energy storage units. The energy storage units are movable with respect to each other via the flexible linkage within each adjacent pair of energy storage units in the encapsulation.

In one embodiment of the second aspect, the step of forming the energy storage unit comprises the steps of folding each of the plurality of interconnected segments in half; and folding, winding, bending, or twisting the multilayer structure into a cylinder, a cube, or a cuboid in each segment.

In one embodiment of the second aspect, the step of forming the energy storage unit comprises the steps of folding each of the plurality of interconnected segments in half; and folding, winding, bending, or twisting the multilayer structure into a triangular prism in each segment.

In one embodiment of the second aspect, the plurality of energy storage units is arranged to combine and form a hexagonal prism.

In one embodiment of the second aspect, the method further comprises the step of providing a buffer member between each adjacent pair of energy storage units.

In one embodiment of the second aspect, the step of providing a multilayer structure comprises the step of depositing electrode materials to form a first electrode and a second electrode, wherein the first electrode and the second electrode are of different thicknesses.

In one embodiment of the second aspect, the multilayer structure is a strain-relieving multilayer structure.

In one embodiment of the second aspect, the step of providing a multilayer structure comprises the step of depositing a single layer of cathode material to form the first electrode and a double layer of anode material to form the second electrode.

BRIEF DESCRIPTION OF THE DRAWINGS

Embodiments of the invention will now be described, by way of example, with reference to the accompanying drawings in which:

FIG. 2A is a perspective view of a battery in accordance with a first embodiment of the present invention;

FIG. 2B is a cross-sectional view of the battery of FIG. 2A;

FIG. 9A is a perspective view of a battery in accordance with a second embodiment of the present invention;

FIG. 9B is a cross-sectional view of the battery of FIG. 9A;

FIG. 16A is a schematic side view of a battery in accordance with a fourth embodiment of the present invention;

FIG. 16B is an image showing a perspective view of the battery of FIG. 16A;

DETAILED DESCRIPTION OF THE PREFERRED EMBODIMENT

The inventors have devised that, through their own research and experiments, some batteries may have only a relatively low volume energy density and capacity due to their simply structures of one or two full layers of anode/separator/cathode stack.

Figure 1:
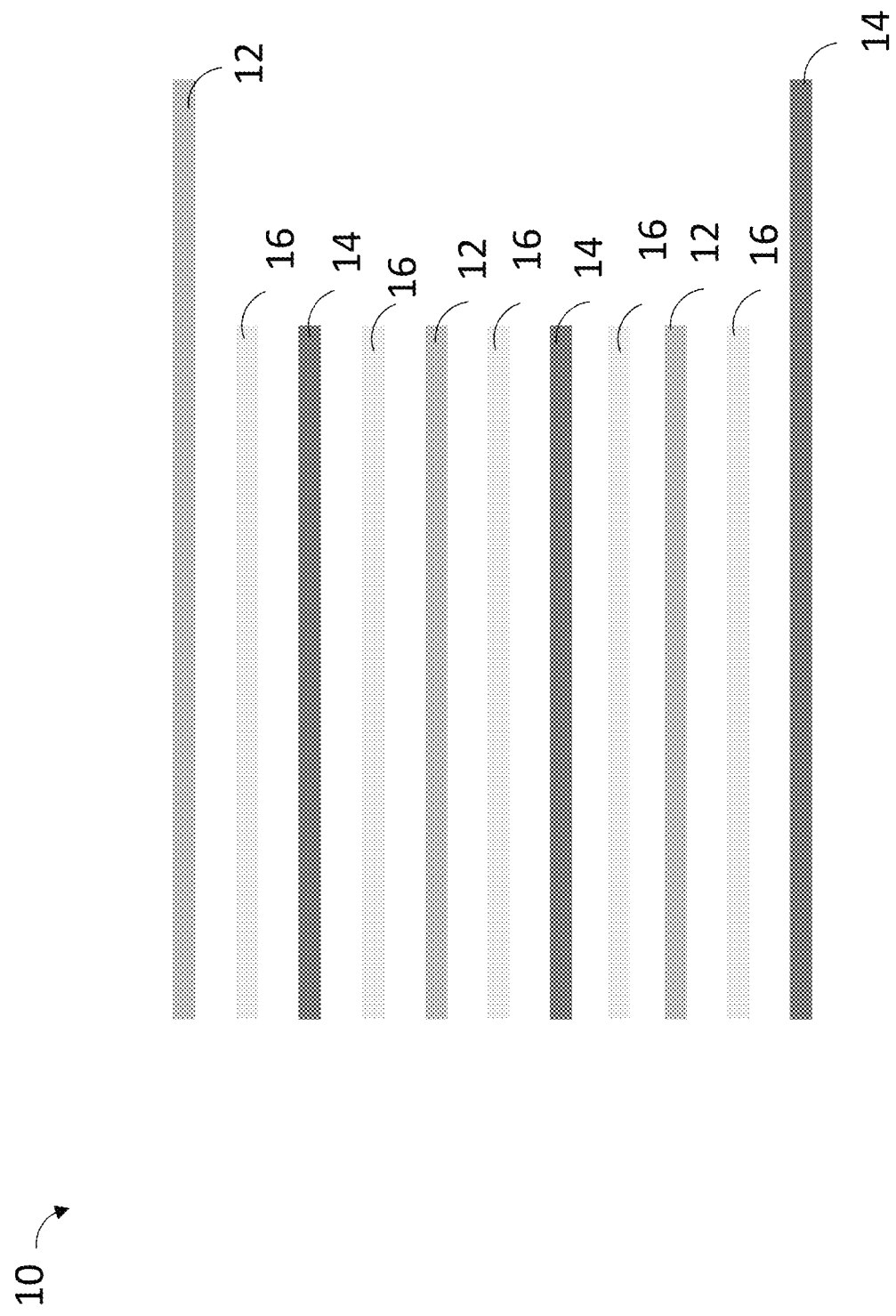
FIG. 1 is a schematic cross-sectional view of a multilayer structure of an exemplary battery.

Without wishing to be bound by theory, batteries of high capacity may be constructed by stacking or winding in many layers. With reference to FIG. 1, there is shown an example multilayer structure of a battery 10 including a number of cathodes 12, anodes 14, and separator layers 16. Each separator layer 16 is sandwiched between each cathode and anode layers 12, 14 to prevent electrical short-circuits while allowing the transport of ionic charge carriers required during the passage of current in the battery. In addition, the battery consists of a rigid stack of the above-mentioned layers, so as to increase the total volume of the electrochemically-active material, thereby increasing the energy capacity of the battery.

However, when the battery is bent, the outer surface endures tensile strain and the inner surface endures compressive strain. Therefore, for a flexible battery with a multilayer structure having relatively inelastic electrodes, there will be obvious slippage between layers when the battery bends or twists due to the multilayer electrode stack, result in capacity fading. In addition, the increase of total thickness of the multilayer stack decreases the mechanical flexibility of the battery.

In accordance with embodiments of the present invention, batteries may be constructed based on different architecture designs to enhance mechanical flexibility of lithium ion batteries. Advantageously, a variety of flexible batteries are obtained for user in different applications by modifying the process of stacking or winding during the manufacturing process.

Figure 8:
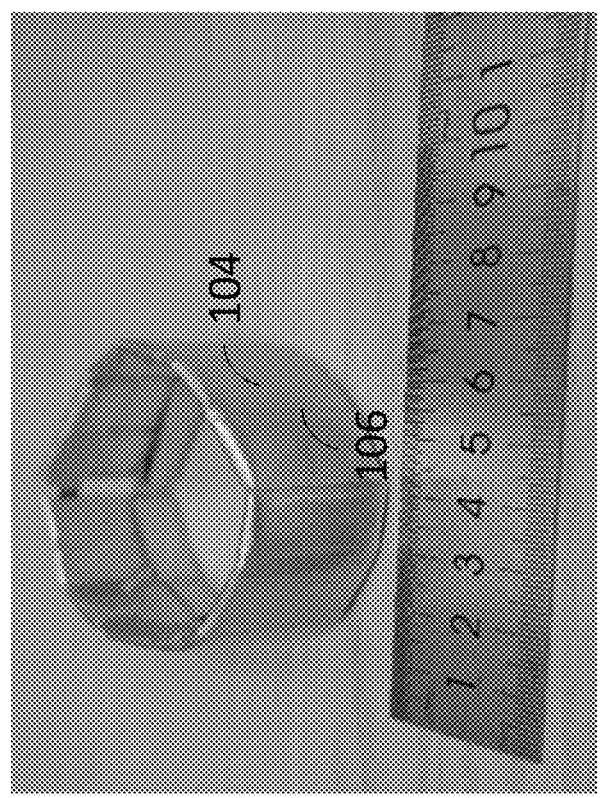
FIG. 8 is an image of the battery of FIG. 5, showing the dimension of the bent battery.
Figure 7:
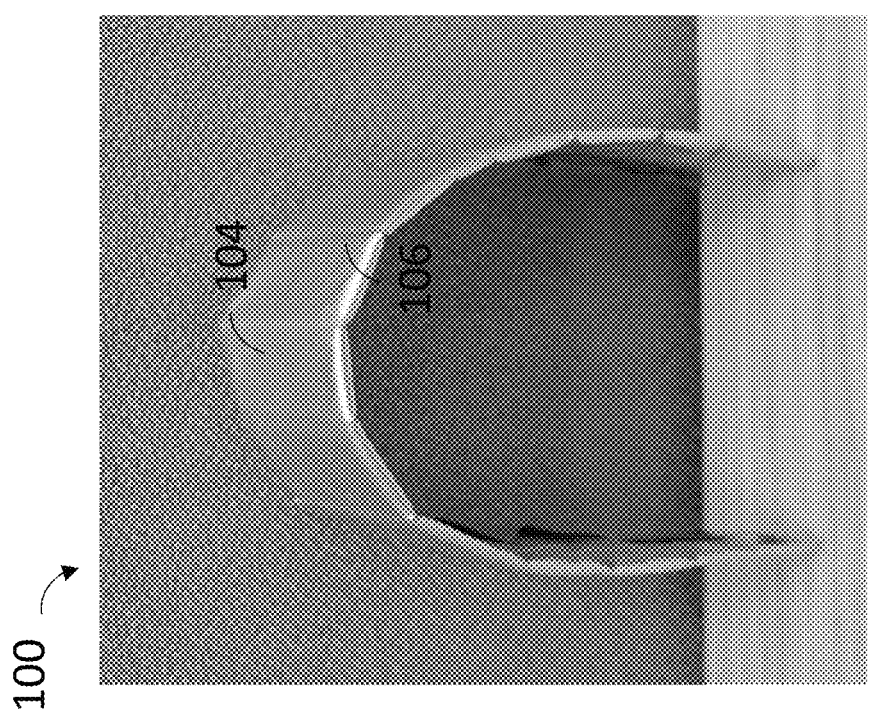
FIG. 7 is an image of the battery of FIG. 5, showing its flexibility.
Figure 10:
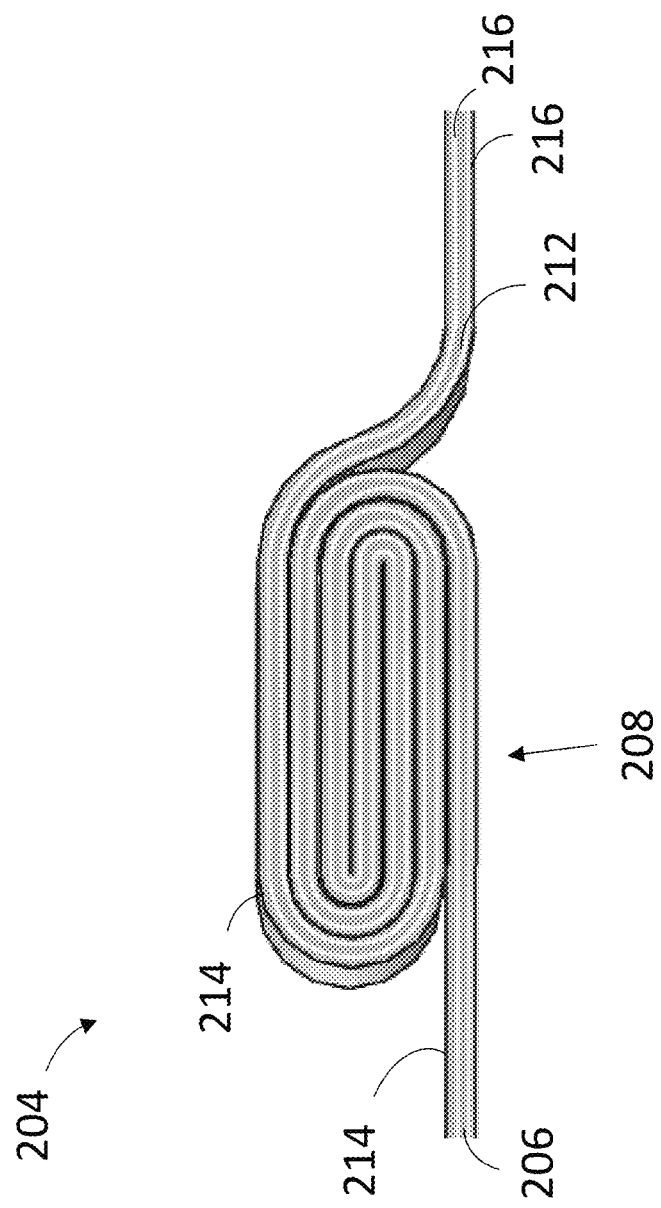
FIG. 10 is a cross-sectional view of a battery segment of the battery of FIG. 9A.

Referring initially to FIGS. 2A, to 8, there is shown a battery 100 according to a first embodiment of the present invention. The battery is a flexible battery 100 that includes a plurality of interconnecting battery segments 102 each defining an energy storage unit 104 and a flexible linkage 106 arranged to physically and electrically connect each adjacent pair of energy storage units 104. The energy storage units 104 and the linkages 106 include a multilayer structure, preferably a strain-relieving multilayer structure 108 such that the strain or stress between the layers is minimized when the battery 100 is bent, twisted or otherwise transformed.

Figure 3:
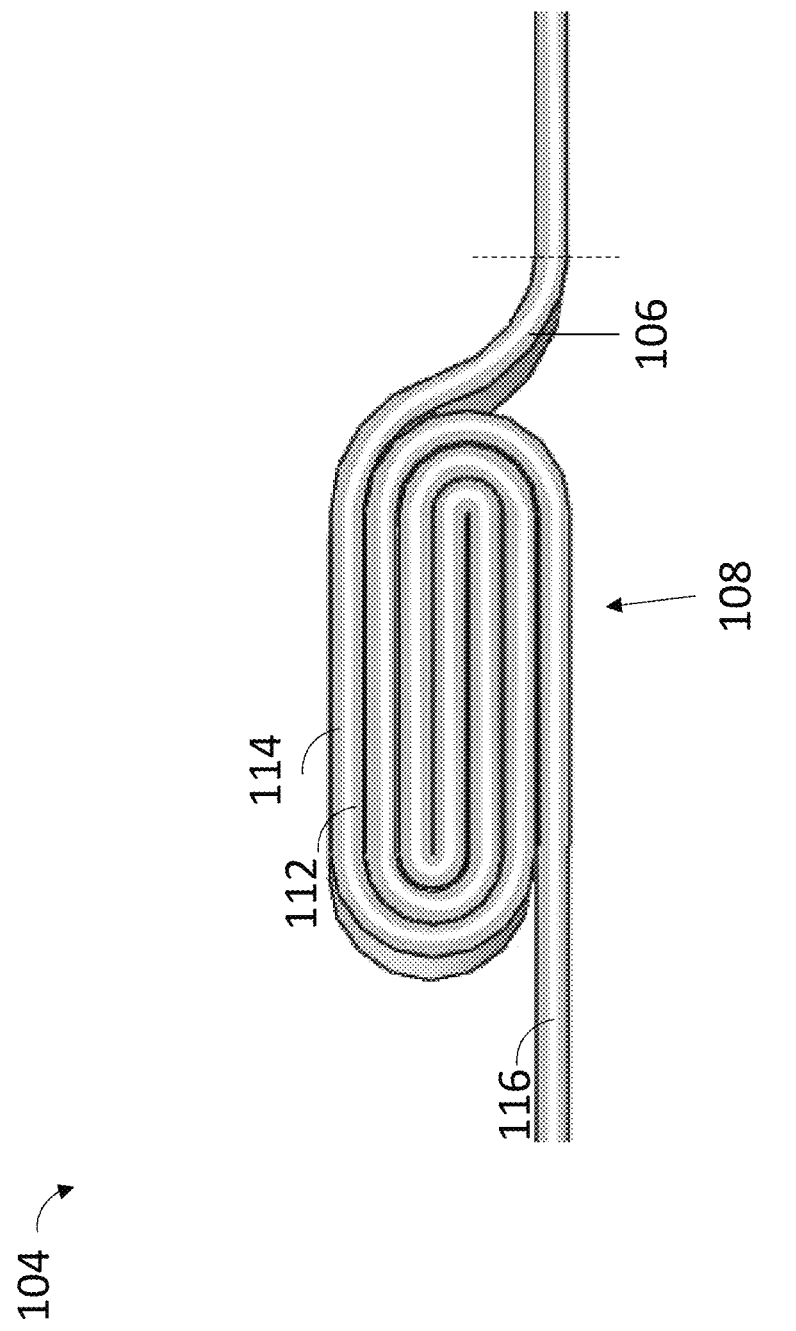
FIG. 3 is a cross-sectional view of one of the battery segments of the battery of FIG. 2A.

As best shown in FIG. 3, the strain-relieving multilayer structure 108 of the battery 100 of the present invention includes two electrodes (a cathode 112 and an anode 114), and a separator 116 between the cathode 112 and the anode 114. Each energy storage unit 104 formed with such multilayer structure 108 may therefore be referred to as an anode/separator/cathode stack. The two electrodes 112, 114 are of the same thickness. The anode and cathode layers 112, 114 are single coated, i.e., each multilayer structure 108 has a single layer of the cathode 112 and a single layer of the anode 114.

In this embodiment, each of the energy storage units 104 and the flexible linkages 106 in the battery 100 includes the same multilayer structure 108. Preferably, all materials in the multilayer structure 108 are flexible. For example, the anode and the cathode may include a flexible current collector, such as a carbon cloth or a sheet of metal, and one or more layers of electrode slurry coated on the current collector.

All of the energy storage units 104 and the flexible linkages 106, thus the interconnecting battery segments 102, may be integrally formed. Each energy storage unit 104 has substantially the same size and shape. The anode/separator/ cathode stacks 104 are thicker than the flexible linkages 106: each flexible linkage 106 includes a single layer of the multilayer structure 108, and each stack 104 includes a folded structure of the multilayer structure 108 (nine layers of the multilayer structure 108) which contributes to the rigidity of the energy storage unit 104 with respect to the flexible linkage 106, and the high capacity for the battery 100. Alternatively, one or more of these energy storage units 104 and the flexible linkages 106 may be separately constructed and further connected together.

Figure 4:
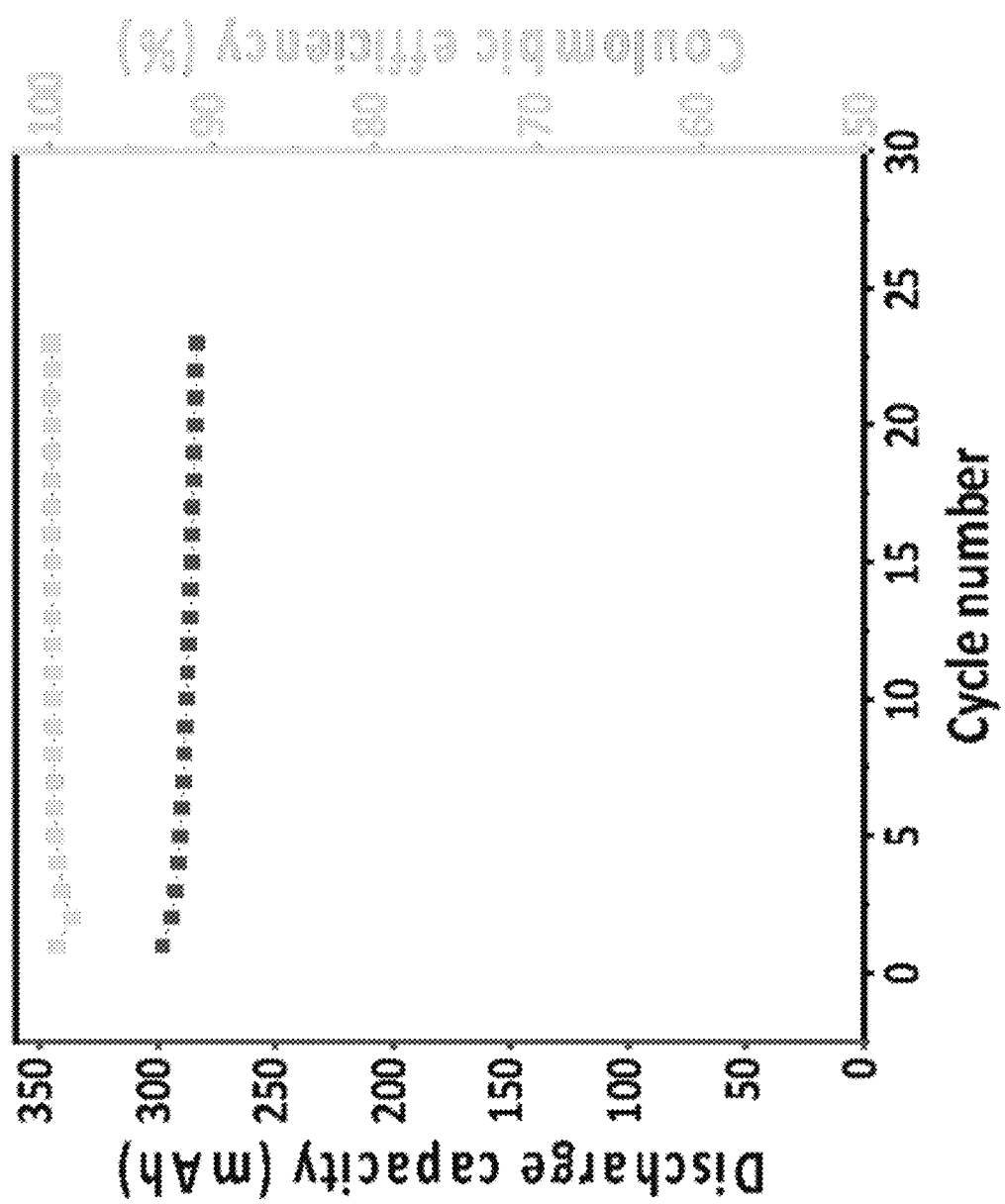
FIG. 4 is a graph showing the electrochemical performance of the battery of FIG. 2A.
Figure 5:
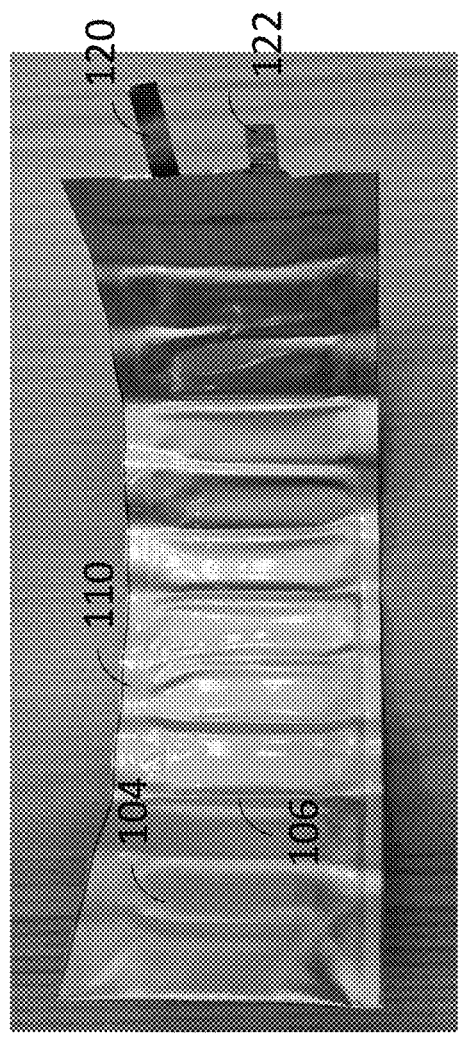
FIG. 5 is an image showing a side view of the battery of FIG. 2A with an encapsulation.
Figure 6:
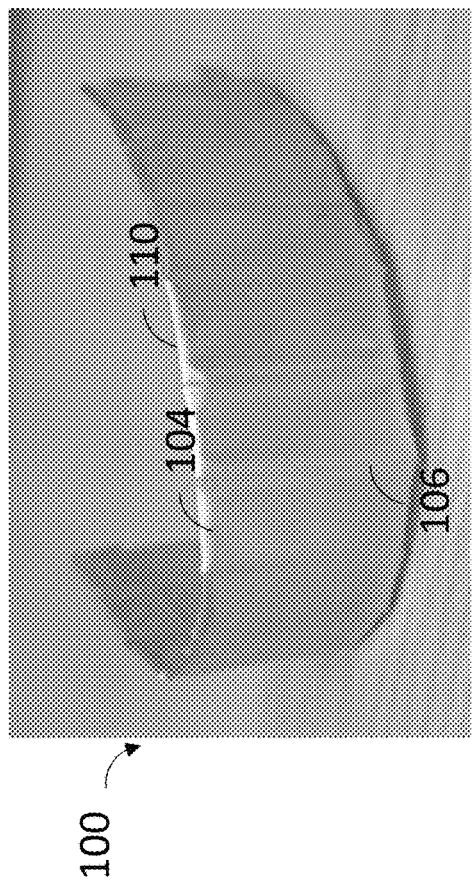
FIG. 6 is an image showing another side view of the battery of FIG. 5.

FIG. 4 shows the electrochemical performance of an example battery having the previously described structure with a size of 170 (L)×28 (W)×1.51 (T) mm and a volume energy density of 149.2 Wh/L. Both the discharge capacity and Coulombic efficiency remain relatively constant as the cycle number increases, demonstrating a promising electrochemical performance.

With reference to FIGS. 5 to 8, in one example embodiment, the battery 100 is formed of 12 interconnecting battery segments 102 encapsulated by an encapsulation 110. The battery also includes two tabs 120, 122 at one end of the battery 100, which act as a positive terminal and a negative terminal connectable to an external device for power supply.

Preferably, the battery 100 may further comprise an encapsulation 110 arranged to protect the multilayer stack of the battery. In this example, the encapsulation 110 is flexible, stretchable and compressible, which, together with the flexible multilayer structure 108, makes the battery 100 capable of bending into different shapes as desired, for example, a U shape (FIGS. 6 and 7) and a ring shape (FIG. 8), thereby providing a great versatility of the battery 100. As shown in FIG. 8, the battery 100 can be transformed into a ring-shaped battery with a diameter of about 60 mm, reducing the overall dimension of the battery. This may be useful when the space for receiving the battery in the external device is small.

Although the energy storage units 104 are relatively rigid due to the folded structure, by choosing the appropriate materials for the interconnecting battery segments 102 and the encapsulation 110, the energy storage units 104 are permitted to move with respect to each other via the flexible linkage 106 within each adjacent pair of energy storage units 104 in the encapsulation 110, thereby achieving the overall flexibility of the battery 100.

On the other hand, since the flexible linkages 106 of each segment may be formed by the same multilayer stack between adjacent energy storage units 104, and by maintaining the flexible linkages 106 relatively thin, the mechanical flexibility in the portions of the flexible linkage 106 allows the adjacent energy storage units 104 to move relatively to each other, even though the energy storage units 104 are relatively rigid when compare to the relatively thinner interconnecting portions.

FIGS. 9A to 14 show a battery 200 according to a second embodiment of the present invention. This embodiment employs much of the same structure as the embodiment of the battery 100 described above with reference to FIGS. 2A and 2B. Accordingly, the following description focuses primarily on the structure and features that are different than the embodiments described above. Like numerals indicate like parts as described in the following paragraphs.

The main difference with the two embodiments is that the cathode and the anode are of different thicknesses. In this embodiment, the strain-relieving multilayer structure 208 includes a cathode 212 which is double coated and an anode 214 which is single coated. In other words, the multilayer structure 208 includes two layers of the anode 214 and a single layer of the cathode 212, with a layer of the separator 216 in between each pair of the cathode and anode layers 212, 214. The illustrated battery 200 includes three layers of the multilayer structure 208 which may be formed by folding the multilayer structure 208 twice.

By providing the cathode and the anode with different thicknesses, when the battery is bent or curved, the thinner electrode in a the inner curvature may be compressed more easily, thus may further enhance the flexibility of the battery, for example when it is curved around a tubular object or a limb portion of a user. Alternatively, based on a different use of material, it is also possible that the thicker electrode is designed to remain relatively unchanged when the battery is bent, with the thinner electrode layer being stretch and/or compressed when the battery is bent during usage.

Figure 11:
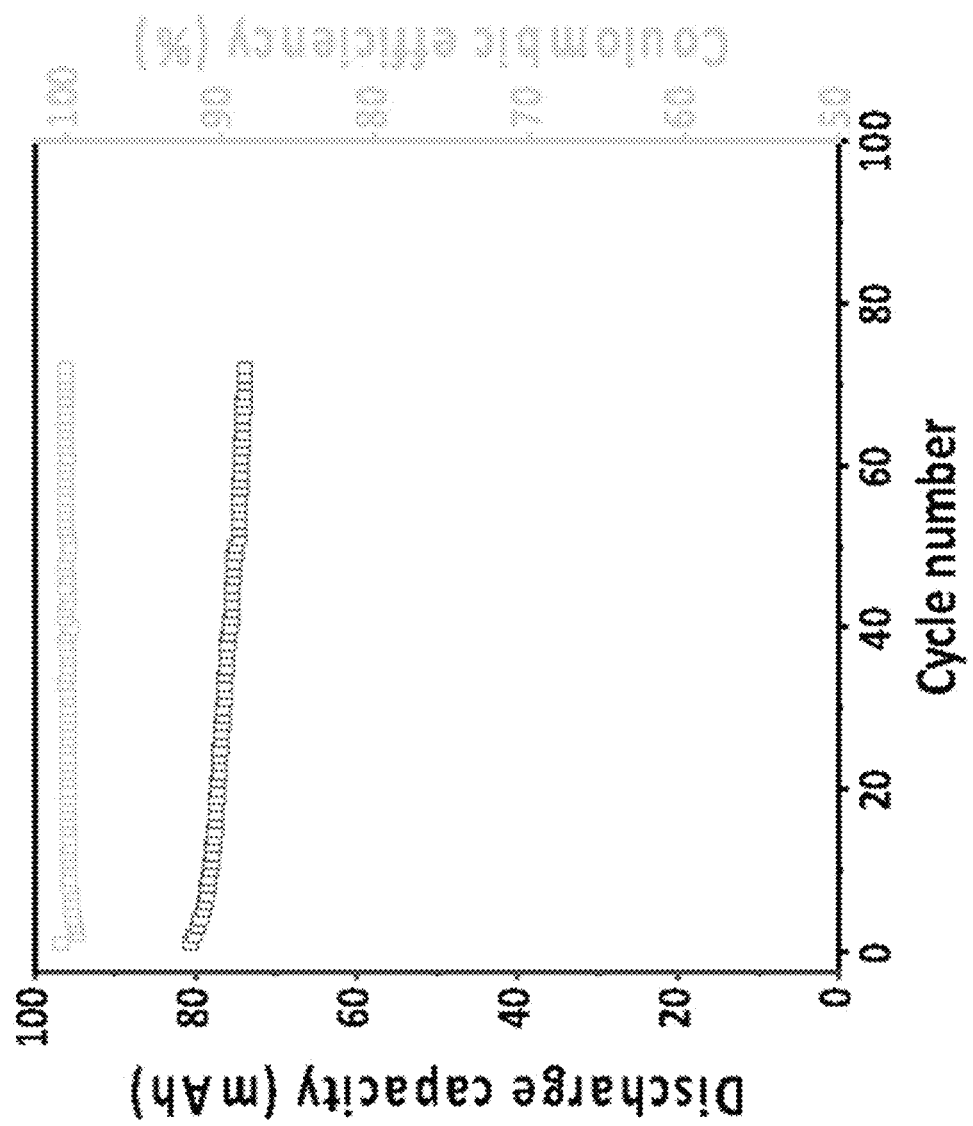
FIG. 11 is a graph showing the electrochemical performance of the battery of FIG. 9A.

FIG. 11 shows the electrochemical performance of an example battery having such multilayer structure with a size of 115 (L)×30 (W)×1.51 (T) mm and a volume energy density of 56.8 Wh/L. Although the discharge capacity decreases slightly as the cycle number increases, the Coulombic efficiency remains relatively constant, demonstrating a promising electrochemical performance.

Figure 12:
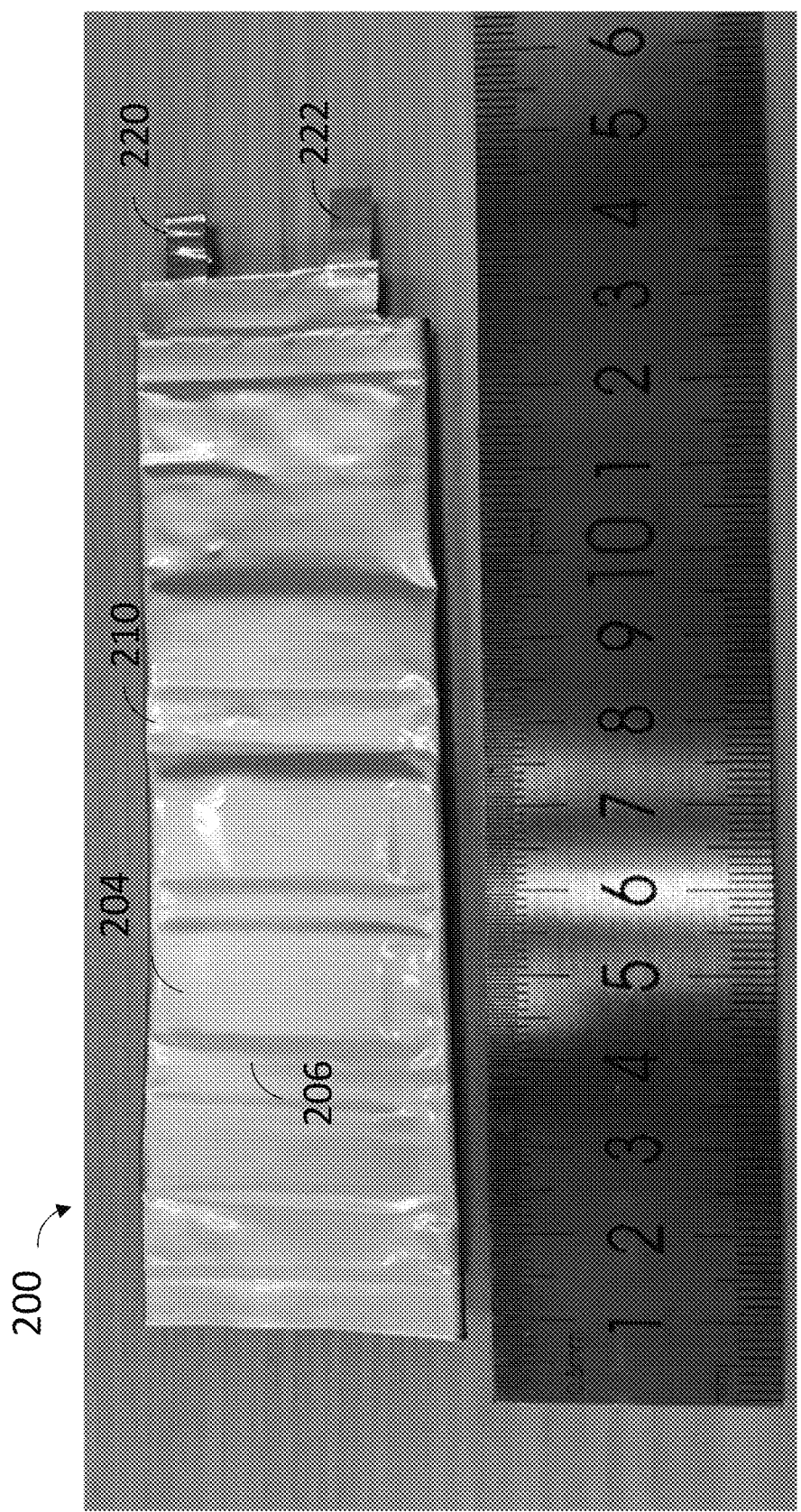
FIG. 12 is an image showing a side view of the battery of FIG. 9A with an encapsulation.
Figure 14:
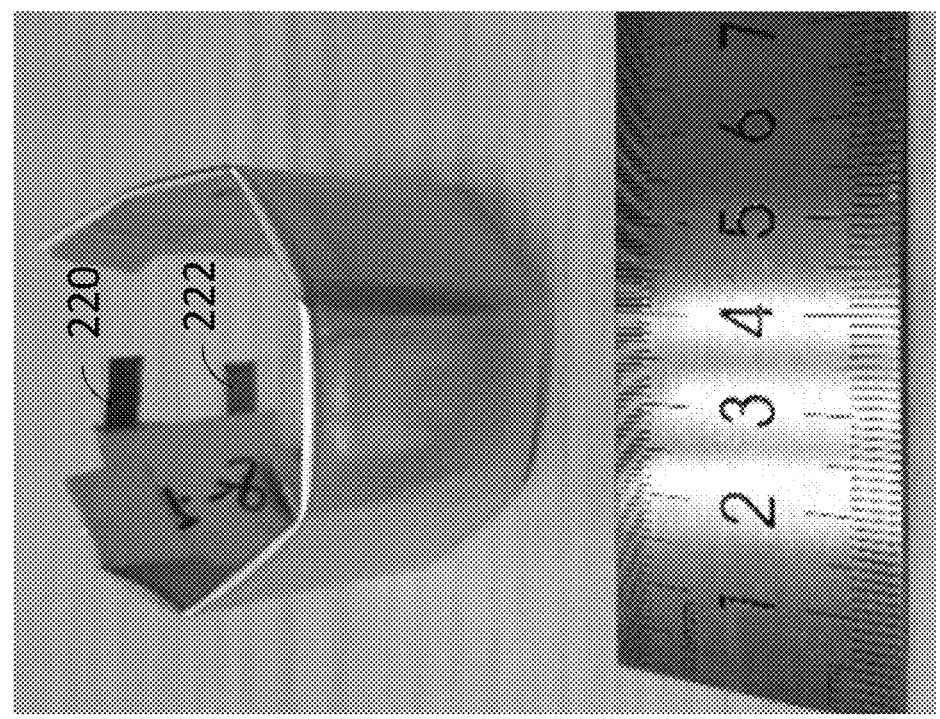
FIG. 14 is an image of the battery of FIG. 12, showing the dimension of the bent battery.
Figure 13:
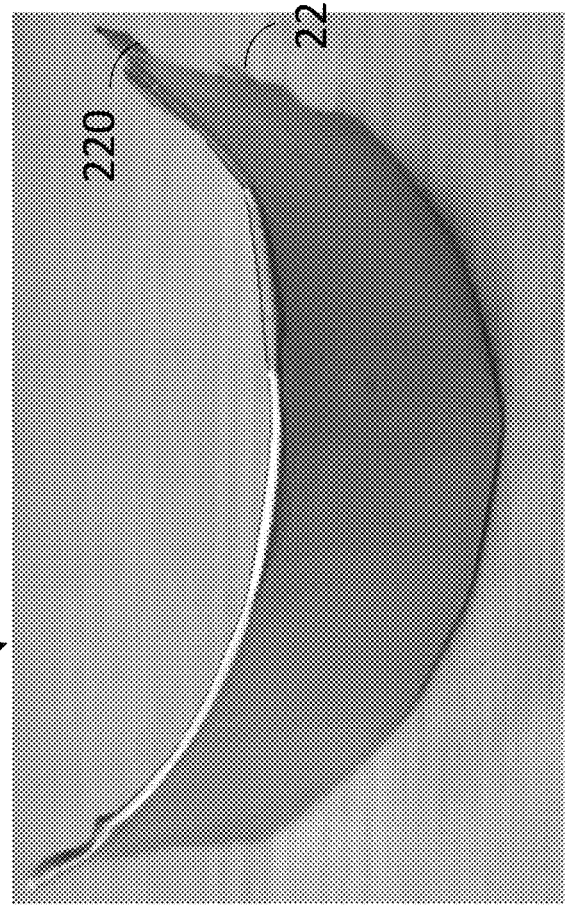
FIG. 13 is an image showing another side view of the battery of FIG. 12.

Similar to the embodiment of FIGS. 5 to 8, with reference to FIGS. 12 to 14, in one example embodiment, the battery 200 is capable of transforming into different shapes. When laid flat (FIG. 12), the battery 200 has a length of about 130 mm, including the length of the tabs. When transformed into a ring shape (FIG. 14), the battery 200 has a diameter of about 50 mm.

Figure 15:
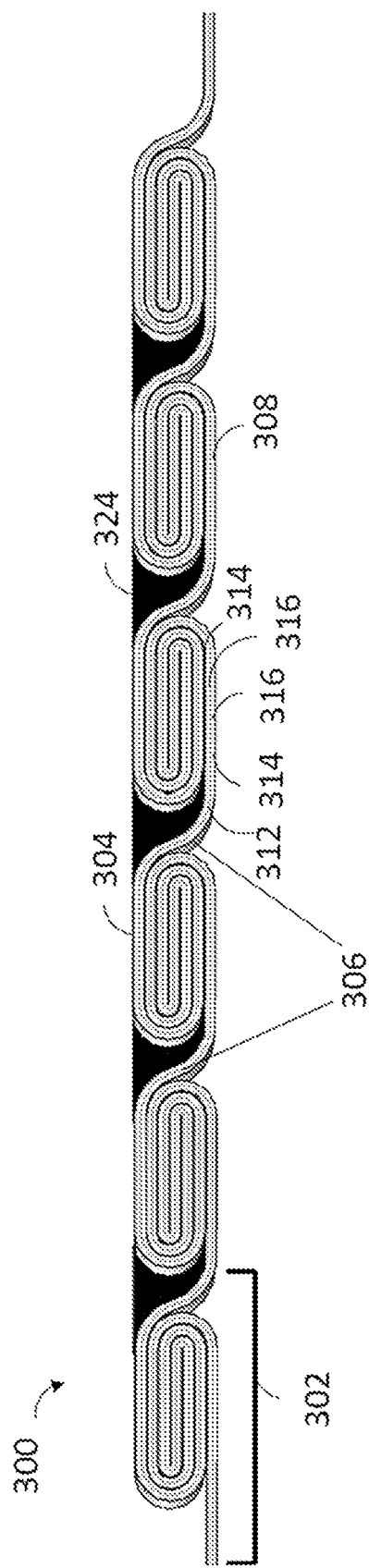
FIG. 15 is a cross-sectional view of a battery in accordance with a third embodiment of the present invention.
Figure 17:
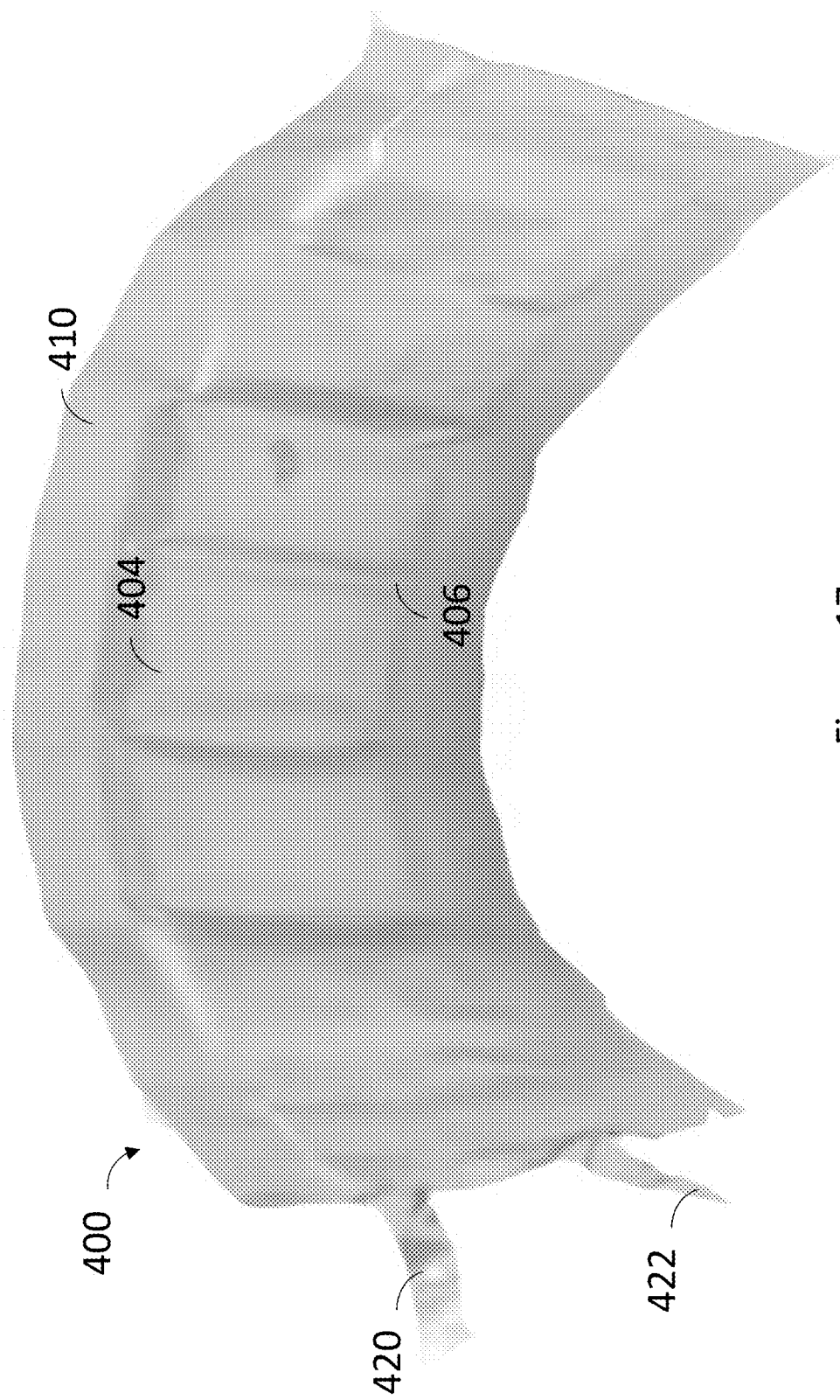
FIG. 17 is an image showing a side view of the battery of FIG. 16A with an encapsulation.

FIG. 15 shows a battery 300 according to a third embodiment of the present invention. This embodiment employs much of the same structure as the embodiment of the battery 200 described above with reference to FIGS. 9A to 14. Accordingly, the following description focuses primarily upon the structure and features that are different than the embodiments described above. Like numerals indicate like parts as described in the following paragraphs.

In this embodiment, the battery 300 further includes a buffer member 324 disposed between each adjacent pair of energy storage units 304. The buffer member 324 is not only arranged to connect the adjacent pair of stacks 304, but also the flexible linkage 306 in between. Preferably, the buffer member 324 includes elastic materials such as a rubber spacer, which serves as a buffer layer to suppress the pressure and strain when the flexible battery 300 is bent, in addition to the strain-relieving multilayer structure 308. In addition, the buffer members 324 also provide additional mechanical supports to adjacent energy storage unit 304 as well as the thinner flexible linkage 306 to enhance the mechanical strength of the bent structure.

FIGS. 16A to 19 show a battery 400 according to a fourth embodiment of the present invention. This embodiment employs much of the same structure as the embodiment of the battery 100 described above with reference to FIGS. 2A to 8. Accordingly, the following description focuses primarily upon the structure and features that are different than the embodiments described above. Like numerals indicate like parts as described in the following paragraphs.

In this embodiment, each of the energy storage units 404 is formed in the shape of a cuboid, each cuboid 404 being thicker and longer than the flexible linkage 406 between them. The short flexible linkages 406 provide the flexibility for the whole flexible battery 400 and experience little stress when the battery 400 is bent, thus greatly improve the durability of the battery 400.

Figure 18:
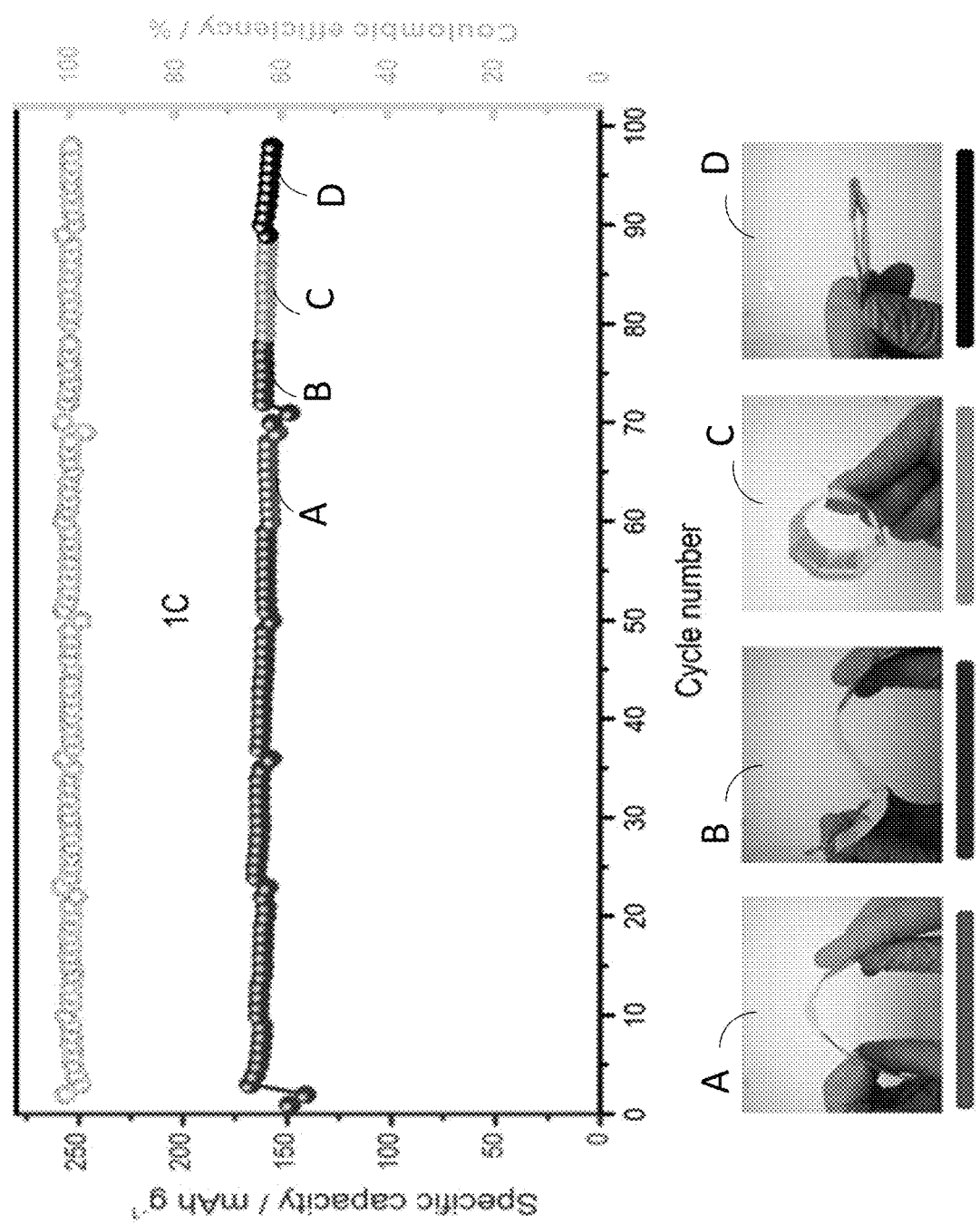
FIG. 18 is a graph showing the electrochemical performance of the battery of FIG. 16A at different bending states.
Figure 19:
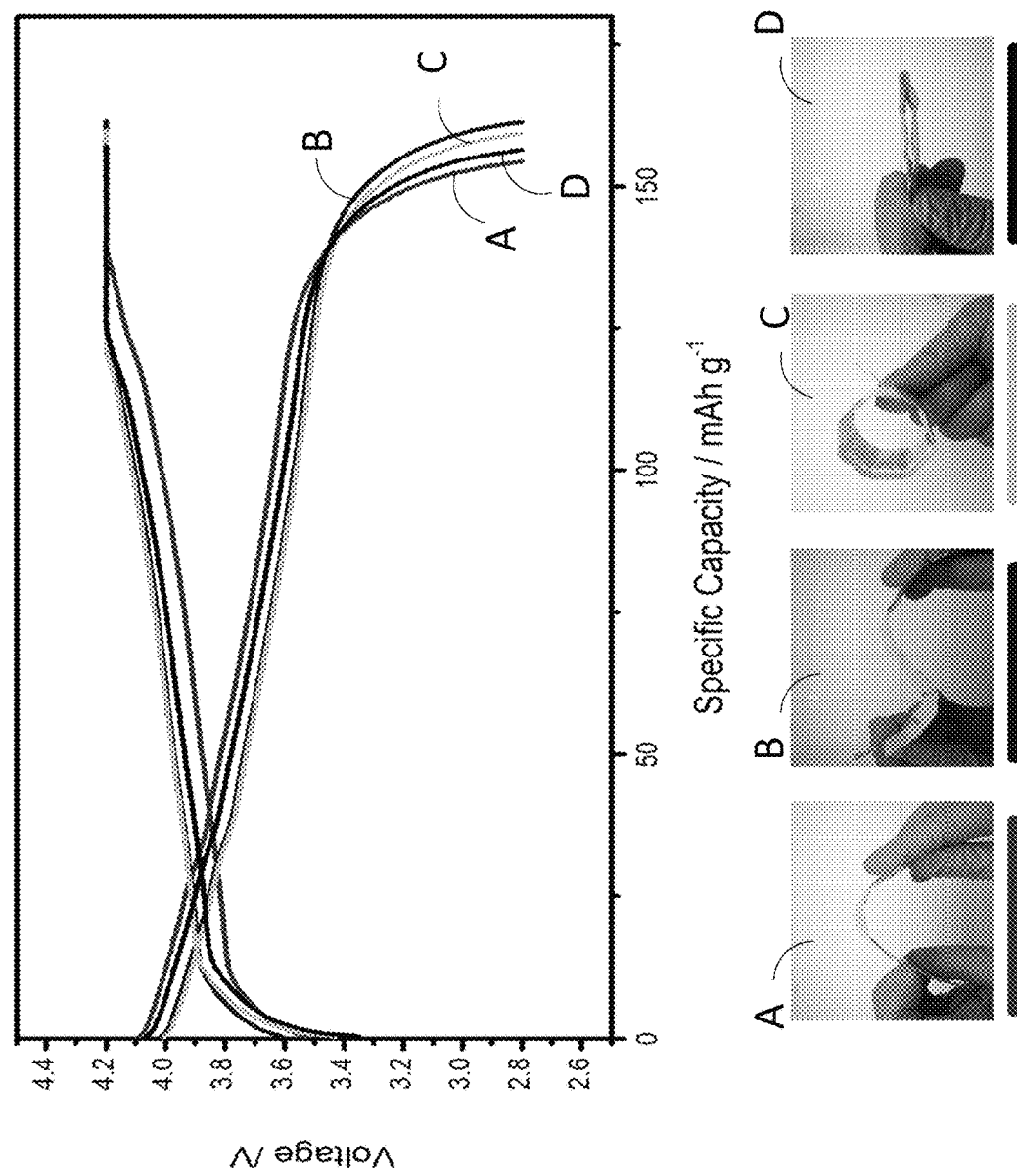
FIG. 19 is a graph showing the galvanostatic charge-discharge curves of the battery of FIG. 16A at different bending states.
Figure 20A:
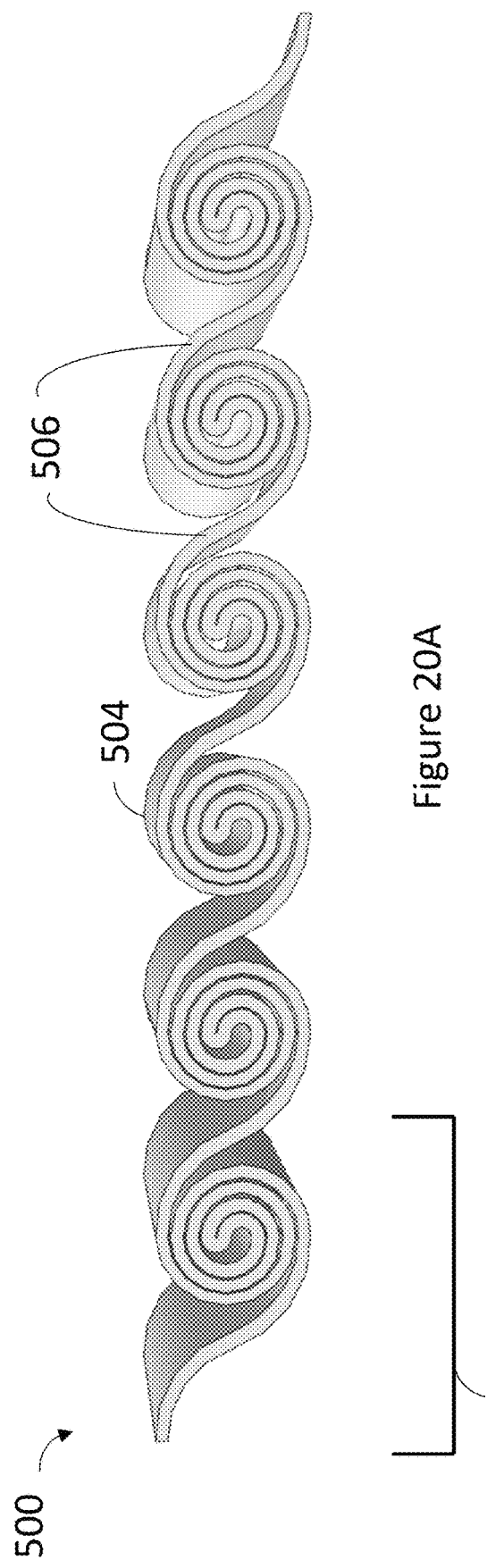
FIG. 20A is a schematic side view of a battery in accordance with a fifth embodiment of the present invention.
Figure 20B:
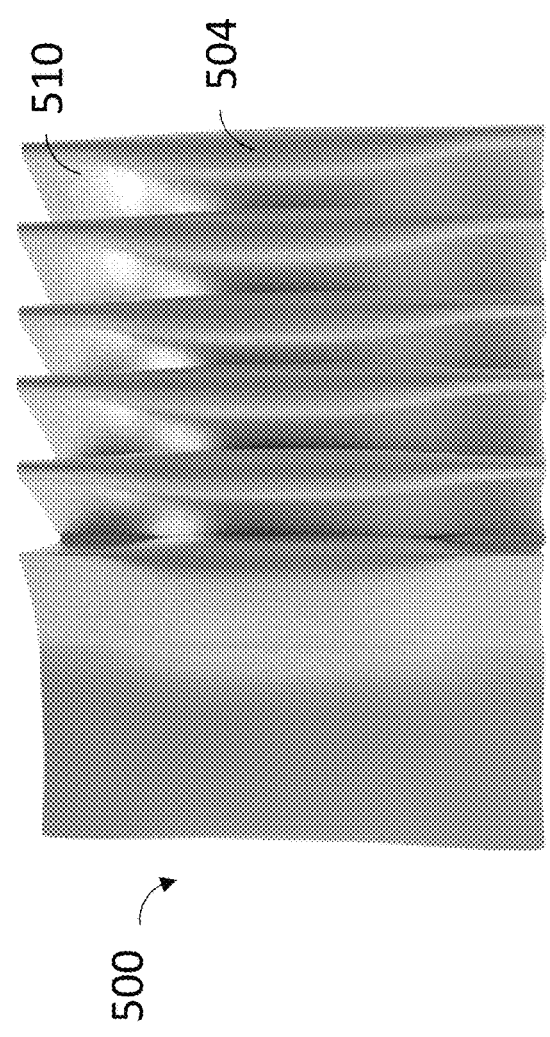
FIG. 20B is an image showing a perspective view of the battery of FIG. 20A with an encapsulation.
Figure 21:
FIG. 21 is an image showing a portion of the battery of FIG. 20A.

FIGS. 18 and 19 show the electrochemical performance and the galvanostatic charge-discharge curves, respectively, of the battery at different bending states. The different bending states include bending the battery into a U shape (state A), bending the battery into a wave shape (state B), bending the battery into a ring shape (state C), and folding the battery in half (state D). It is demonstrated that the specific capacity, the Coulombic efficiency, and the voltage at different bending states are very similar, indicating that the electrochemical performance of the flexible battery can be maintained regardless of the bending state. It is also realized that the loss of volume energy density of the battery can be less than 10% when the energy storage units are in the shape of a thick cuboid.

FIGS. 20A to 22 show a battery 500 according to a fifth embodiment of the present invention. This embodiment employs similar structure as the embodiment of the battery 100 described above with reference to FIGS. 2A to 8. Accordingly, the following description focuses primarily upon the structure and features that are different than the embodiments described above. Like numerals indicate like parts as described in the following paragraphs.

In this embodiment, each of the energy storage units 504 is formed in the shape of a cylinder. Again, the thinner flexible linkages 506 allow the battery 500 to be transformed into different shapes. The cylinders 504 may be formed with a wound structure or a spiral structure of the multilayer structure 508. Alternatively, the cylindrical energy storage units 504 may be form by folding similar to the previous embodiments.

Figure 22:
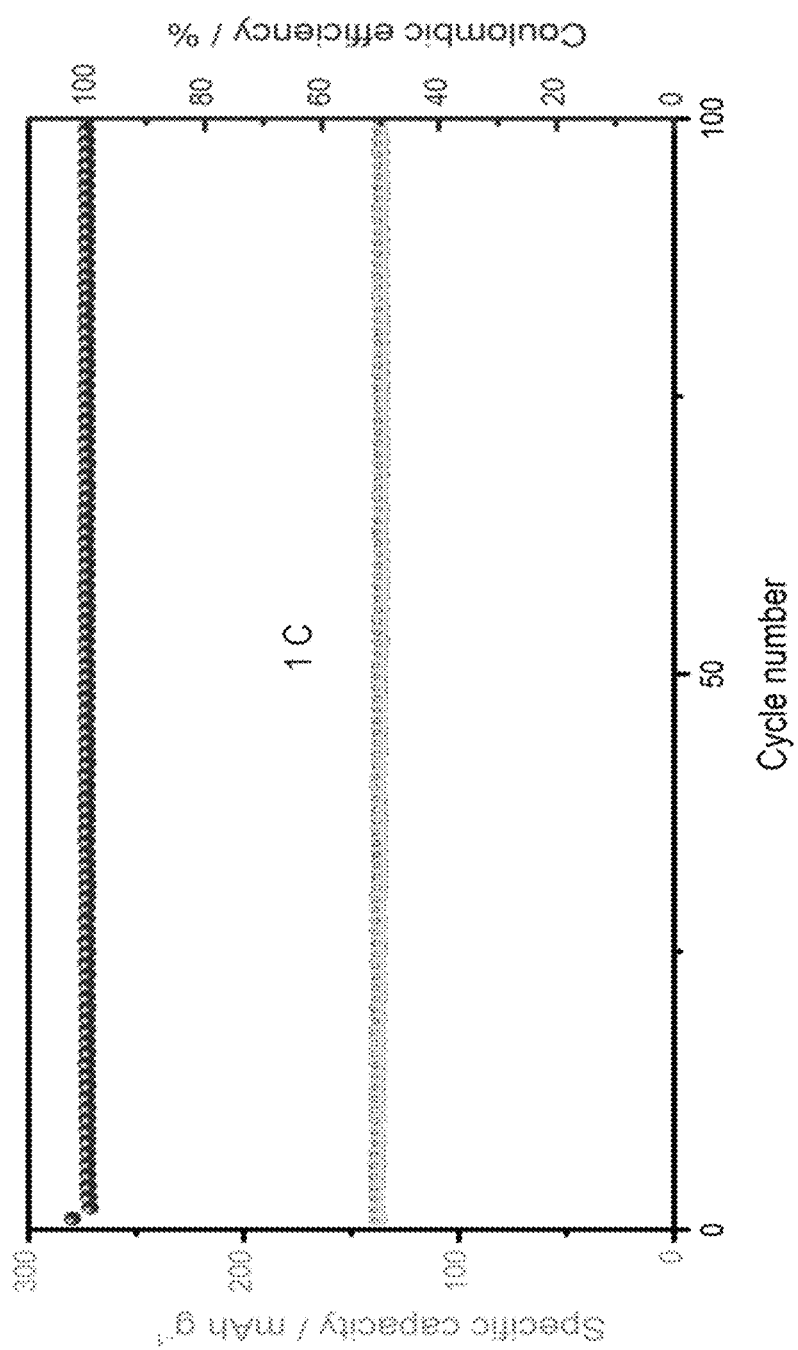
FIG. 22 is a graph showing the electrochemical performance of the battery of FIG. 20A.

FIG. 22 illustrates the electrochemical performance of the battery 500 in one example embodiment with cylindrical energy storage units. Similar to the embodiments above, the battery demonstrates a great electrochemical performance with relatively constant specific capacity and Coulombic efficiency throughout the experiment. It is also realized that when the flexible battery is composed of cylindrical thick stack, the flexible battery can not only bend and twist, but also stretch. In addition, the battery is able to bend at any position along the battery, providing an excellent flexibility.

Figure 23:
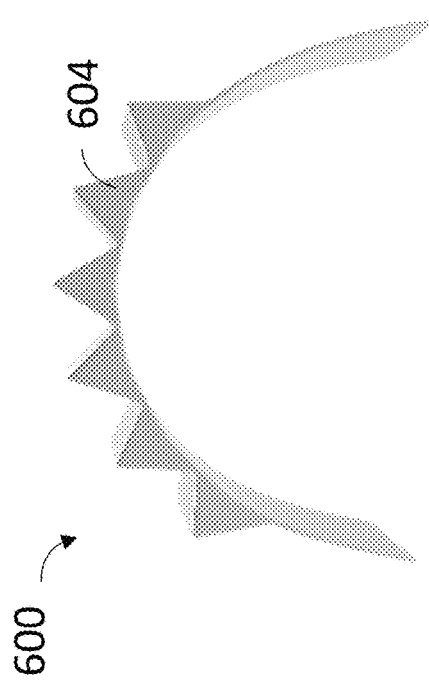
FIG. 23 is a schematic view of a battery in accordance with a sixth embodiment of the present invention.
Figure 24:
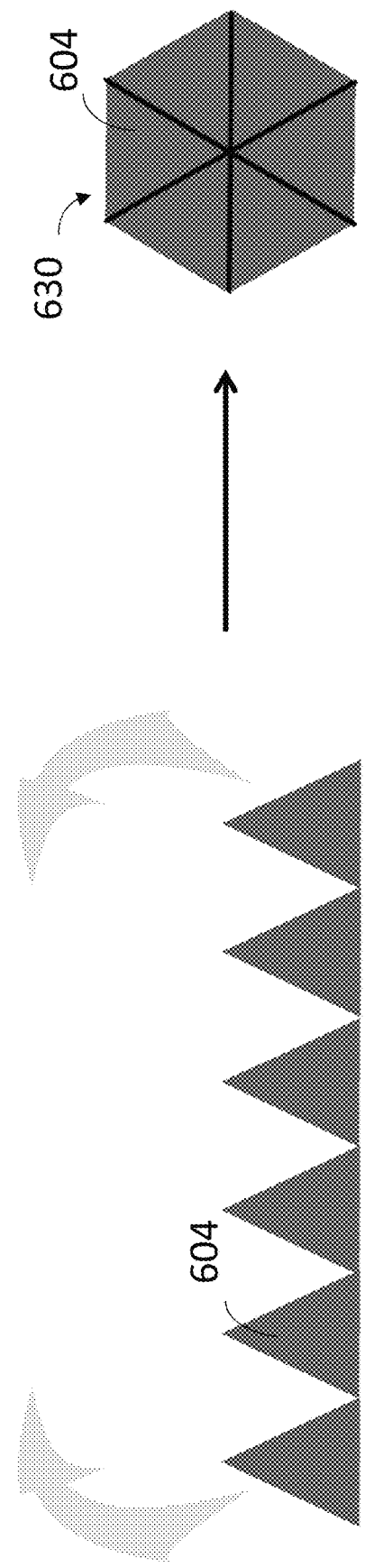
FIG. 24 is a flow diagram showing the formation of a battery with the shape of a hexagonal prism using the battery of FIG. 23.
Figure 25B:
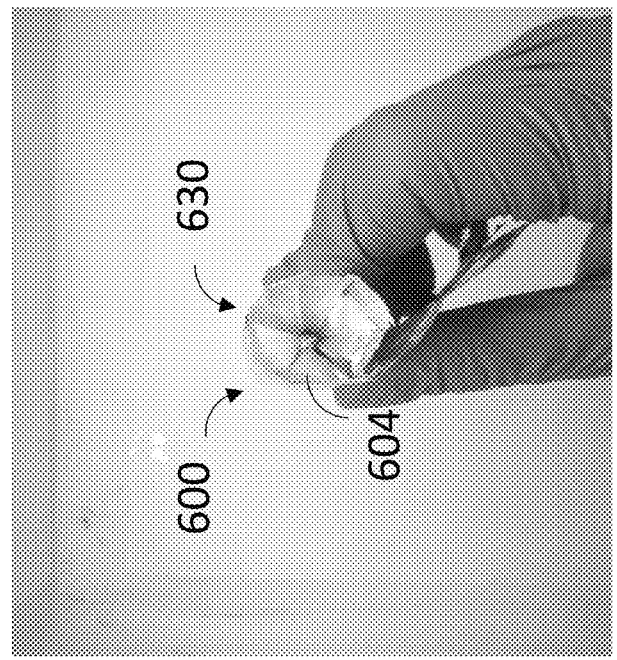
FIG. 25B is an image showing the battery with the shape of a hexagonal prism formed using the battery of FIG. 25A.
Figure 25A:
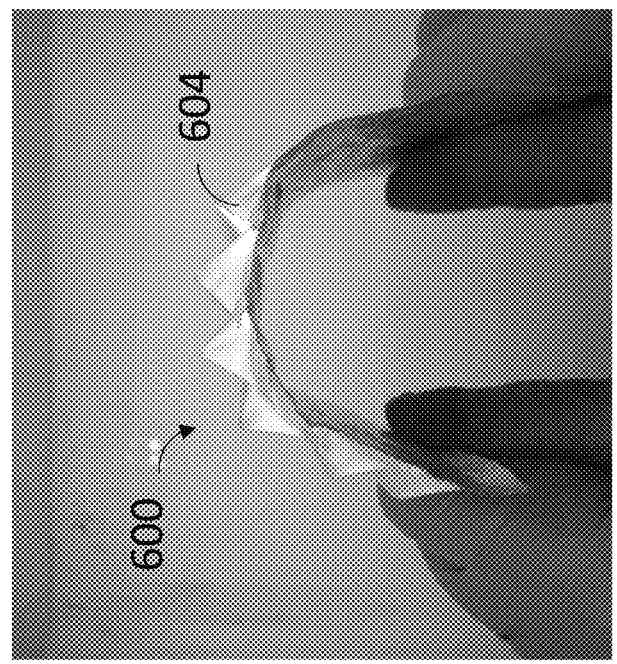
FIG. 25A is an image showing the battery of FIG. 23 with an encapsulation.

FIGS. 23 to 25 show a battery 600 according to a sixth embodiment of the present invention. This embodiment employs much of the same structure as the embodiment of the battery 100 described above with reference to FIGS. 2A to 8. Accordingly, the following description focuses primarily upon the structure and features that are different than the embodiments described above. Like numerals indicate like parts as described in the following paragraphs.

In this embodiment, each of the energy storage units 604 is formed in the shape of a triangular prism. The triangular prisms 604 may further combine and form a hexagonal prism 630 when there are six triangular prisms 604 in the battery. For example, the triangular prisms 604 at opposite ends may be brought together to combine the six triangular prisms 604 thus forming the hexagonal prism 630. Preferably, each triangular prism 604 is a uniform triangular prism, and the hexagonal prism formed 630 is a regular right hexagonal prism.

In operation, when it is desired to transform the shape and size of the battery, a user may fold, bend, twist or stretch the battery. Such flexibility of the battery allows an adaptive transformation under different circumstances. For example, when the battery receptacle within the device is round, the battery may be readily and conveniently transformed into a ring shape and received in the round receptacle. Alternatively, when the battery receptacle in rectangular, the battery may be folded into a cuboid to fit into the rectangular receptacle. Although not illustrated in the accompanying figures, the combination of the energy storage units, the flexible linkages, and the encapsulation may also be twistable or stretchable when appropriate materials are used, for example, when elastic or resilient materials are used.

Figure 26:
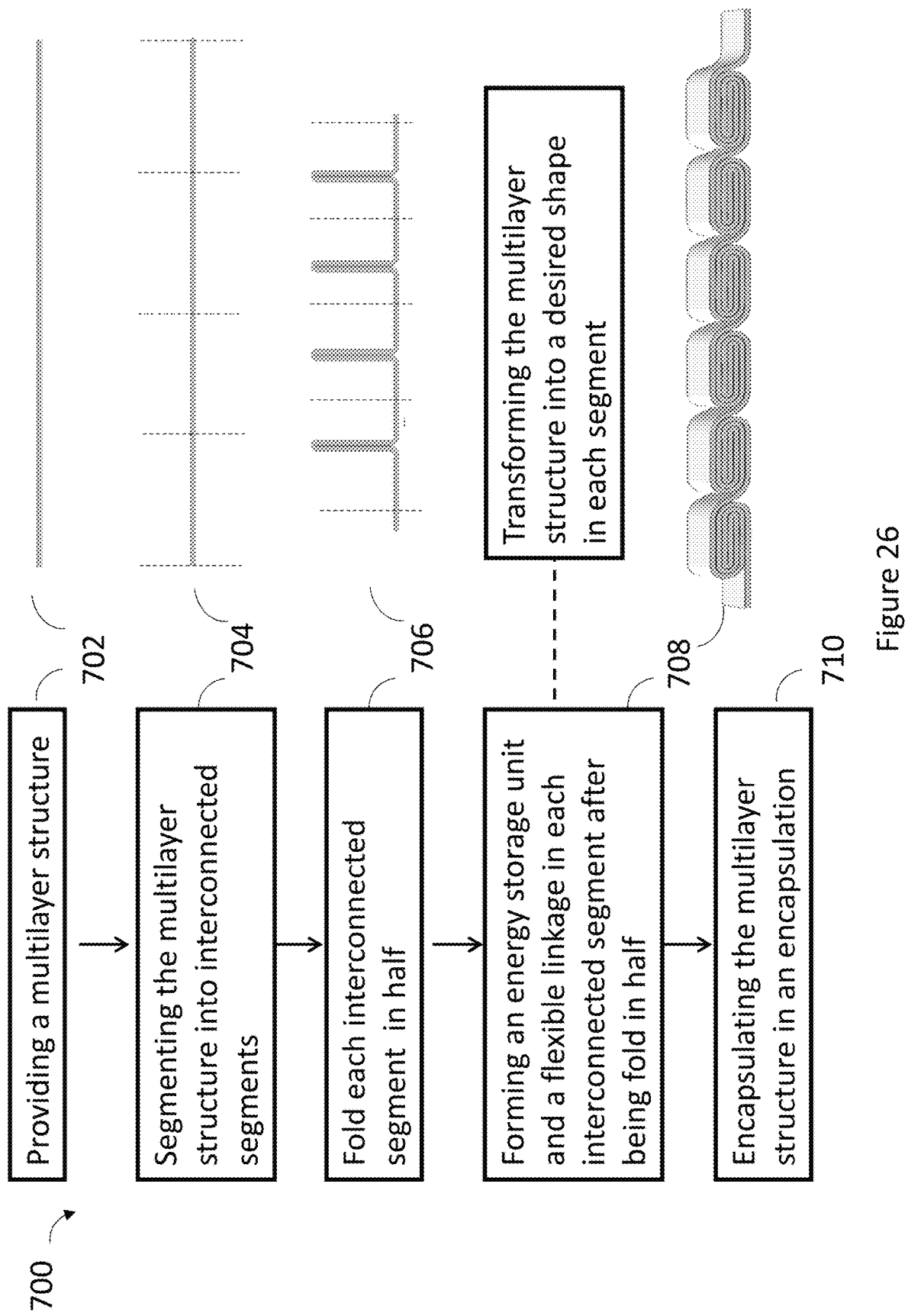
FIG. 26 is a flow diagram illustrating a method of manufacturing a battery in accordance with one embodiment of the present invention.

Turning to the method of manufacturing a battery (for example, the batteries 100, 200, 300, 400, 500, 600 illustrated above), FIG. 26 illustrates a general method 700 thereof in accordance with one embodiment of the present invention. The method 700 begins in step 702, in which a multilayer structure with at least an anode, a cathode, and a separator between the anode and the cathode is provided. Preferably, the multilayer structure is a strain-relieving multilayer structure which facilitates transformation of the battery.

Electrode materials are deposited separately to form a cathode and an anode. Similar to conventional cathodes and anodes, the cathode is composed of cathode active materials, conductive additives, and a current collector, and the anode is composed of anode active materials, conductive additives, and a current collector. The cathode and the anode may be of the same thickness or different thicknesses, as described above, by depositing the appropriate amounts of electrode materials. Preferably, all electrode materials are flexible.

In the embodiment where the method is utilized to prepare the battery 100 in FIGS. 2A to 8 (where the cathode and the anode are both single coated), step 702 includes depositing a single layer of anode material to form the anode and a single layer of cathode material to form the cathode.

In the embodiment where the method is utilized to prepare the battery 200 in FIGS. 9A to 14 (where the cathode is double coated and the anode is single coated), step 702 includes depositing a single layer of cathode material to form the cathode and a single layer of anode material to form the anode.

The method then proceeds to step 704, in which the multilayer structure is segmented into a plurality of interconnected segments. Preferably, the multilayer structure is equally segmented such that each interconnected segment has substantially the same shape and size, making it easier to perform the subsequent steps of the method.

Next, in step 706, an energy storage unit and a flexible linkage are formed in each of the interconnected segments. In one embodiment, the segment is divided into two uneven portions. Preferably, the energy storage unit is formed using the larger portion of the segment, and the flexible linkage is formed using the smaller portion of the segment so that the overall dimension of the energy storage unit is greater, e.g. thicker, than that of the flexible linkage. The larger portion of each of the segments may be folded in half, then the folded halves in each segment may be further shaped as desired in step 708.

This step 708 involves transforming, such as folding, winding, bending, or twisting, the multilayer structure into a desired shape in each segment. In particular, a portion of each segment is transformed into the desired shape, forming the energy storage unit with the desired shape, while another portion of the segment is remained unchanged (i.e. not processed or transformed), forming the linkage connected to the energy storage unit, which is flexible relative to the energy storage unit. These flexible linkages in the battery, as described above, are physically and electrically connect each adjacent pair of energy storage units.

The energy storage units may be in the shape of a cube, a cuboid, a cylinder, or a triangular prism. For example, to form a cube or a cuboid, a portion of the multilayer structure may be folded in half first and further folded until the desired thick stack is formed. Alternatively, to form a cylinder or a triangular prism, a portion of the multilayer structure may be first folded in half, then bent or rolled into the desired shape.

Finally, in step 710, the multilayer structure is encapsulated in an encapsulation. That is, all of the energy storage units and the flexible linkage in between are all encapsulated. Preferably, the multilayer structure and the encapsulation are both flexible. Specifically, the linkage between the energy storage units is flexible such that the energy storage units are movable with respect to each other via the flexible linkage, achieving the overall flexibility of the battery despite the rigid folded structure of the energy storage units.

As an additional step, if it is desired to transform the battery into a hexagonal prism (as shown in FIGS. 23-25), the method may further includes combining the energy storage units to form the hexagonal prism. In one embodiment, the energy storage units are in the shape of a triangular prism, and the battery includes at least six triangular prisms. The hexagonal prism may be formed by rolling one end of the battery towards another end such that the six triangular prisms combine and form the desired hexagonal prism.

Optionally, the method may also include the step of providing a buffer member between each adjacent pair of energy storage units to further relieve strain and stress when the battery is bent or twisted. The buffer member may include a resilient material, such as rubber.

Accordingly, the present invention provides a flexible battery with high flexibility, volume energy density, and specific capacity based on its structural design. The present flexible battery is beneficial in that it is versatile and can be used in different applications, such as transportation, military, robots, sports and medical applications, providing a long-term and promising power for various flexible wearable devices including flexible phones, flexible screen, flexible sensors, flexible electronic skin, smart clothing, etc.

The present invention is advantageous over the conventional flexible batteries. For example, the present flexible battery with multilayer anode/separator/cathode stacks, instead of only one or two layers in the conventional flexible batteries, provides a higher volume energy density and specific capacity. Such structure also solves the strain/stress issue when bending the layers.

Advantageously, the flexible battery may be manufactured easily by firstly preparing a long battery multilayer stack, then segmenting the long stack by forming individually the energy storage portions and the flexible linkages by folding the stack to form the thicker portions in each segments.

Also, the present flexible battery can be easily manufactured by minor modification of preparation process without the introduction of any other flexible materials so the overall production cost is close to the corresponding general commercial battery. Further, most of the production processes of the present flexible battery are the same as those of the corresponding general battery, so it is beneficial to carry out large scale production on the basis of the traditional battery production.

It will be appreciated by persons skilled in the art that numerous variations and/or modifications may be made to the invention as shown in the specific embodiments without departing from the spirit or scope of the invention as broadly described. For example, although the battery as described above is a lithium ion battery, batteries with other chemistry are also contemplated in the present invention, e.g. a zinc ion battery, a sodium ion battery, a potassium battery, etc.

Construction of battery may also be different to the embodiments described above. For example, each of the energy storage units and the flexible linkages in the battery may include different multilayer structures. The multilayer structures may also be of different structures compared to the multilayer structures above. In one example, the energy storage units may include double coated anode and single coated cathode, while the flexible linkages may include single coated anode and single coated cathode. In another example, each multilayer structure may have the same layering of electrodes (e.g. single coated anodes and cathodes), but the thickness of the electrodes in the multilayer structures of the energy storage units and the flexible linkages may be different.

It will be appreciated that the flexible battery may not include energy storage units that are made of flexible materials. In this case, the overall flexibility of the battery is achieved by the flexible linkage and encapsulation.

The method of manufacturing the battery may also be different. For example, the multilayer structure may not be equally segmented as long as the desired shape can be formed. Also, the formation of the energy storage unit may not involve transforming the multilayer structure e.g. folding, winding or bending. For example, the energy storage unit may be made of a thicker multilayer structure from the beginning.

Although the formation of a cube, a cuboid, a cylinder and a triangular prism is described by first folding a portion of the segment in half, it will be understood that the portion may be directly twisted and spiraled without being folded.

The described embodiments of the invention should therefore be considered in all respects as illustrative, not restrictive. Any reference to prior art contained herein is not to be taken as an admission that the information is common general knowledge, unless otherwise indicated.

The invention claimed is:

1. A battery comprising:
   a plurality of interconnected battery segments defining:
      a plurality of energy storage units; and
      at least one flexible linkage each physically and electrically connecting respective two adjacent energy storage units,
      wherein the plurality of energy storage units together define opposite first and second sides both extending along a length of the battery, and
      wherein each of the at least one flexible linkage respectively extends from the first side to the second side to respectively define a first space between the flexible linkage and one of the two adjacent energy storage units along the first side and a second space between the flexible linkage and another one of the two adjacent energy storage units along the second side:
   at least one buffer member, each disposed in a respective one of the first space and
   an encapsulation arranged to encapsulate the plurality of interconnected battery segments,
      wherein two adjacent energy storage units are movable with respect to each other via the corresponding flexible linkage in the encapsulation;
      wherein the energy storage units and the at least one flexible linkage include the same multilayer structure, which comprises, at least, a first electrode, a second electrode, and a separator between the first electrode and the second electrode; and
      wherein each of the energy storage units comprises a folded structure, a wound structure, or a spiral structure of the multilayer structure.

2. The battery according to claim 1, wherein the multilayer structure is a strain-relieving multilayer structure.

3. The battery according to claim 2, wherein the first electrode and the second electrode are of different thicknesses.

4. The battery according to claim 2, wherein the strain-relieving multilayer structure comprises a first electrode which is single coated and a second electrode which is double coated.

5. The battery according to claim 4, wherein the first electrode is an anode and the second electrode is a cathode.

6. The battery according to claim 1, wherein each of the energy storage units has a shape of a cylinder, a cube, or a cuboid.

7. The battery according to claim 1, wherein each of the energy storage units has a shape of a triangular prism.

8. The battery according to claim 7, wherein the plurality of energy storage units are arranged to combine and form a shape of a hexagonal prism.

9. The battery according to claim 8, wherein the battery comprises six energy storage units each having the shape of a triangular prism.

10. The battery according to claim 1, wherein the encapsulation is flexible.

11. The battery according to claim 1, wherein a combination of the energy storage units, the at least one flexible linkage, and the encapsulation is stretchable.

12. The battery according to claim 1, wherein each of the at least one buffer member includes a rubber spacer.

13. A method of manufacturing a battery, comprising the steps of:
provided a multilayer structure comprising an anode, a cathode, and a separator between the anode and the cathode;
segmenting the multilayer structure into a plurality of interconnected battery segments;
based on the plurality of interconnected battery segments, forming a plurality of energy storage units and at least one flexible linkage between respective two adjacent energy storage units, wherein each of the energy storage units comprises a folded structure, a wound structure, or a spiral structure of the multilayer structure, wherein the plurality of energy storage units together define opposite first and second sides both extending along a length of the battery, and wherein each of the at least one flexible linkage respectively extends from the first side to the second side to respectively define a first space between the flexible linkage and one of the two adjacent energy storage units along the first side and a second space between the flexible linkage and another one of the two adjacent energy storage units along the second side;
providing at least one buffer member, each of the at least one buffer member being disposed in a respective one of the first space; and
encapsulating the multilayer structure in an encapsulation;
wherein the flexible linkage is arranged to physically and electrically connect respective two adjacent energy storage units, and
wherein two adjacent energy storage units are movable with respect to each other via the corresponding flexible linkage the encapsulation.

14. The method according to claim 13, wherein the step of providing a multilayer structure comprises the step of depositing electrode materials to form a first electrode and a second electrode, wherein the first electrode and the second electrode are of different thicknesses.

15. The method according to claim 14, wherein the multilayer structure is a strain-relieving multilayer structure.

16. The method according to claim 14, wherein the step of providing a multilayer structure comprises the step of depositing a single layer of anode material to form the first electrode and a double layer of cathode material to form the second electrode.

17. The battery according to claim 1, wherein each of the buffer member connects with respective two adjacent energy storage units and the corresponding flexible linkage between the respective two adjacent energy storage units.

18. The battery according to claim 1, wherein each of the at least one buffer member includes an elastic material.

19. The battery according to claim 1, wherein each of the at least one buffer member includes a resilient material.

20. The method according to claim 13, wherein each of the at least one buffer member connects with respective two adjacent energy storage units and the corresponding flexible linkage between the respective two adjacent energy storage units.

21. The method according to claim 13, wherein each of the at least one buffer member includes an elastic material.

22. The method according to claim 13, wherein each of the at least one buffer member includes a resilient material.

23. The method according to claim 13, wherein forming the plurality of energy storage units and at least one flexible linkage between respective two adjacent energy storage units comprises folding each of the interconnected battery segments in half.

24. The battery of claim 1, wherein each of the at least one buffer member is arranged to relieve stress and/or strain on the battery when the battery is bent.

25. The battery of claim 1, wherein in a relaxed state, each of the at least one buffer member completely fills the respective first space.

* * * * *